UNITED STATES PATENT OFFICE 2,315,871

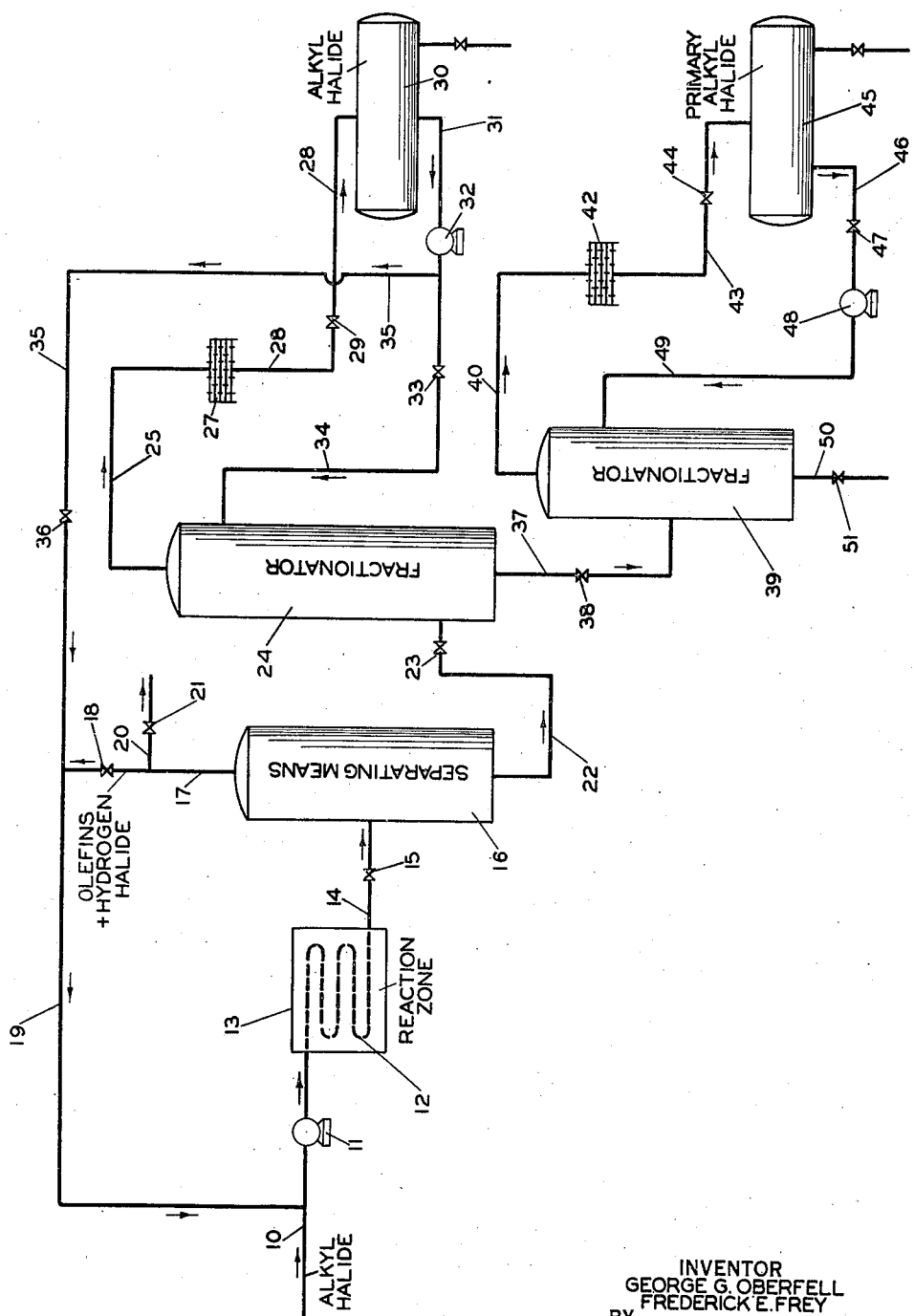

PROCESS FOR TREATING MONOHALIDES

George G. Oberfell and Frederick E. Frey, Bartlesville, Okla., assignors to Phillips Petroleum Company, a corporation of Delaware Application April 24, 1941, Serial No. 390,208

17 Claims. (Cl. 260—658)

The present invention relates generally to the production of valuable derivatives of paraffin hydrocarbons and more specifically to the intramolecular rearrangement of isomeric forms such as secondary and tertiary alkyl halides to primary alkyl monohalides.

Halogen derivatives of hydrocarbons have been produced in a number of ways. Generally they are produced directly from hydrocarbons, as by the chlorination of paraffin hydrocarbons or by the addition of hydrogen halides such as hydrogen chloride to olefin hydrocarbons. Satisfactory yields of alkyl halides have also been obtained from the treatment of alcohols with highly reactive halogen compounds such as phosphorous halides, antimony halides, and the like, or by treating them with hydrogen halides in the presence of strong, oxygen containing mineral acids. The degree of halogenation in some cases depends on the character of the hydrocarbon, period of treatment as in direct chlorination and other conditions controlling the reaction. We are primarily interested in the monohalogen derivatives of hydrocarbons.

There are three types or classes of monohalogen derivatives of paraffin hydrocarbons, namely, (1) primary, (2) secondary and (3) tertiary, in which the halogen is connected to a carbon which is in turn connected to one, two, or three other carbon atoms respectively. Methyl halides, which do not conform to any of these types are generally considered to be primary halides and monohalogen derivatives of a very few other hydrocarbons such as ethyl halides, neopentyl halides, neooctyl halides, neooctyl halides and the like can only be primary alkyl halides. However, the alkyl halides which may be considered derivatives of other paraffins such as propane, the butanes, normal and isopentane and the like, may or may not be primary halides.

When alkyl halides are formed by the limited halogenation of such paraffins or by the addition of hydrogen halide to olefins, all the possible monohalides are produced, i. e. primary, secondary and tertiary. Haas, McBee, and Webber (Ind. Eng. Chem. 28, 333 (1935)) report that the monochlorides produced from the chlorination of isopentane resulted in 50 per cent of combined primary chlorides, 28 per cent of the secondary chlorides and 22 per cent of the tertiary chlorides.

The monohalogen derivatives of paraffin hydrocarbons are finding widening industrial application and are principally used as solvents, intermediate compounds in the preparation of other hydrocarbon derivatives such as alcohols, ethers, esters and the like. For many purposes they are much to be preferred over the possible secondary or tertiary isomers, both when the alkyl halides are used as such or when such other hydrocarbon derivatives are produced from them. Thus, primary alkyl halides are much more stable when used as solvents and the like than are the corresponding secondary or tertiary forms. Also, alcohols, esters and other hydrocarbon derivatives produced from primary alkyl halides are formed with fewer side reactions such as olefin formation than when secondary or tertiary halides are reacted under similar conditions. In many cases the side reactions take place to such an extent as to make the use of secondary and tertiary alkyl halides impractical. Also, halogen and hydrocarbons consumed in the formation of less desirable alkyl halides and the corresponding hydrocarbons may represent a considerable waste of raw materials and expense. Therefore the industry has for some time been confronted with the problem of economically disposing of these materials or of converting them into the corresponding and more useful primary form.

It is the primary object of the present invention to provide a process for the conversion of secondary and tertiary alkyl halides to primary alkyl halides in an economical and practicable manner.

A further object of the invention is to provide a process whereby waste of raw materials and expense ordinarily occasioned in the production of primary alkyl halides are eliminated.

A still further object of this invention is to increase the production of the more useful forms of alkyl halides from hydrocarbons by halogenation methods.

Further objects and advantages of this invention will become apparent to those skilled in the art as the disclosure and discussion proceed.

We have discovered that secondary and tertiary alkyl monohalides may be converted into primary alkyl halides of the same molecular weight by subjecting the secondary and tertiary forms to certain conditions of elevated temperatures and pressures to effect an intramolecular rearrangement of the alkyl halides in the absence of catalysts. In some instances, where catalysts are not employed, the walls of the reaction vessel may fortuitously act to catalyze the reaction. The temperatures which we propose to employ are generally above 350° F. and not higher than 1300° F., since much higher temperatures cause decomposition reactions and tar formations to take place. Preferably we do not operate in excess of about 950° F. to produce the best results. By the use of catalysts even lower temperatures may be employed and more favorable yields obtained with fewer side reactions and less formation of waste products. The catalysts which may be advantageously employed are natural clays, floridin, kaolin, bauxite, alkali or alkaline earth metal oxides such as calcium oxide, other metallic oxides such as alumina, zirconia and thallium oxide, and also salts such as barium chloride, calcium chloride, ferric chloride, calcium phosphate and the like. These materials are not to be considered as equivalents and in many instances metal oxides are preferred along with small traces of free oxygen, or reactive oxygen-containing compounds, of the order of 0.001 to 0.5 per cent of free oxygen. When catalysts are used temperatures of 350 to 750° F. are ordinarily sufficient to effect the formation of primary monohalides at a satisfactory rate.

We have found in the practice of the present invention that relatively high pressures are ordinarily desirable, particularly when the higher temperatures are employed in the reaction zone. It has been found that pressures of from 200 up to 5000 pounds per square inch may be employed, depending on the particular temperature and whether a catalyst is used in carrying out the process. When especially high pressures are employed the upper limit is determined by the strength of the apparatus.

While the use of high temperatures favor the formation of primary alkyl halides and considerably speed up the molecular rearrangement, their use also is conducive to undesirable side reactions such as the formation of decomposition products and higher molecular weight material. Therefore, the time the material is subjected to these higher temperatures needs to be carefully adjusted as regards the particular halides being treated and pressures which are employed. Generally the reaction should not proceed for a period longer than allows the formation of about 10 per cent of higher molecular weight products in the effluents of the reaction zone and ordinarily this does not exced 10 minutes for lower temperatures (350° F.) or about 5 seconds for the extremely high temperatures (1300° F.).

In addition to primary alkyl halides, there is ordinarily produced in the reaction zone olefins and hydrogen halide, which later may be taken from the top of the separating tank and recirculated through the reaction zone. Favorable effects on the production of the desirable products are produced by returning these decomposition products to be passed through the process, as one modification of our invention, as well as unchanged secondary and/or tertiary halides. It is preferable to maintain an excess of the hydrogen halide over the olefins to encourage formation of the primary alkyl halides and therefore the olefins coming from the separator may be partially or completely removed. The primary alkyl halides and unreacted isomeric forms are further separated in a fractionator, the more volatile isomeric forms comprising secondary and tertiary halides being taken from the top of the fractionator and recirculated to the reaction zone.

The process may be more fully understood by reference to the accompanying figure which illustrates diagrammatically one arrangement of apparatus suitable for practicing the invention. Obviously, however, various other arrangements might be employed and equally successful results obtained.

Material comprising essentially a low boiling alkyl monohalide which is not a primary halide, passes through conduit 10 and is compressed by pump 11 to a desired superatmospheric pressure, which will ordinarily be in excess of 200 pounds per square inch, and passes to the reaction zone diagrammatically illustrated at 12, located in a furnace 13. The reaction zone 12 may be a simple coil or series of so-called tubes, and if a catalyst is used may be a catalyst chamber, or a combination coil and catalyst chamber. In the reaction zone 12 the material is subjected at a superatmospheric pressure to a reaction temperature which effects a partial decomposition of the alkyl halides present for a period of time such that not more than small amounts of higher molecular weight products are formed, whereby a molecular rearrangement of the isomeric alkyl halides takes place. The effluents of the reaction zone pass through conduit 14 and pressure reduction valve 15 which serves to regulate the pressure in the reaction zone and thereafter the material is introduced to the separating means 16 which may be a simple flash vaporizer, a fractionating column, or the like. The separation is effected at a superatmospheric pressure, preferably somewhat less than the pressure existing in the reaction zone 12, and at this point a separation takes place betwen lighter products such as olefins and hydrogen halides and the primary alkyl halides together with unreacted secondary and tertiary forms. The lighter products pass from the separating means 16 through conduit 17 and may continue through valve 18 and conduit 19 to be re-introduced into the reaction zone through conduit 10. Alternatively, and especially when low pressures are used in reaction zone 12, the hydrogen halide is separated in means not shown and returned to the reaction zone, while the olefins are removed from the system through conduit 20 and valve 21.

Alkyl halides and any heavier materials are removed from separating means 16 through conduit 22 and valve 23 to the fractionator 24. In the fractionator 24 separation is effected between the unreacted secondary and/or tertiary alkyl halides and the primary derivatives. In nearly every case the primary alkyl halides have appreciably higher boiling points than the isomeric secondary and tertiary forms and therefore form a higher boiling fraction together with higher molecular weight products, while the isomeric halides which were not reacted in passing through reaction zone are carried from the top of the fractionator 24 through conduit 25, cooler 27 where they are condensed, and thereafter carried through conduit 28 and valve 29 to the run tank 30. The material may be taken from the tank 30 by means of conduit 31, compressed to suitable pressure by pump 32, and passed through conduit 34 and valve 33 to the top of fractionator 24 as reflux, or it may be passed partially or completely through conduit 35 and valve 36 to conduit 19 and then conduit 10 for retreatment in the process. The higher boiling material containing the desired primary alkyl halides passes from the bottom of fractionator 24 through conduit 37, valve 38 to fractionator 39. In the fractionator 39 the primary alkyl halide or halides, are separated from heavier or higher boiling material, which may have been formed in the reaction zone, and passed off the top through conduit 40, cooler 42, conduit 43 and valve 44 to the run tank 45 from which it may be withdrawn as desired. A reflux may be maintained at the top of fractionator 39 by passing material from tank 45 through conduit 46 and valve 47, by pump 48 through conduit 49 to the top of the fractionator. The higher boiling material is removed from the fractionator 39 by means of conduit 50 and valve 51.

As an example of the process, secondary propyl chloride was passed through the reaction zone at a temperature of 527° F. and at a pressure of 2200 pounds per square inch. Primary propyl chloride was formed along with small amounts of propylene and hydrogen chloride, which was taken off from the top of the separator and returned to the reaction zone to increase the yield. At this temperature and pressure very little formation of higher molecular weight material took place.

In a similar manner secondary butyl fluoride may be subjected to a temperature of 725° F. and a pressure of 2500 pounds per square inch whereby a good yield of primary butyl fluoride is obtained.

Likewise other secondary butyl halides may be transformed to more desirable primary butyl halides and a tertiary butyl halide such as tertiary butyl chloride, may be transformed into isobutyl chloride, and various secondary and tertiary amyl halides into primary amyl halides. Primary alkyl bromides may be produced from isomeric or nonprimary alkyl bromides by procedures similar to those described above. In each case for optimum yields, the temperature and pressure must be adjusted to the particular material being treated since higher temperatures are necessary in the case of the more reactive halogen derivatives. Such optimum conditions for any particular alkyl halide may be readily determined by trial, by one skilled in the art, in the light of the present disclosure and discussion. The maintenance of relatively high pressures is necessary in the case of the comparatively stable isomeric forms requiring high temperatures to prevent side reactions and decomposition.

We claim:

1. A process for the production of primary alkyl monohalides from isomeric alkyl monohalides of the same molecular weight, which comprises subjecting a material comprising nonprimary alkyl monohalides to conditions of elevated temperature and superatmospheric pressure effecting substantial intramolecular rearrangement of said nonprimary alkyl monohalides to a primary alkyl monohalide.

2. A process for the production of primary alkyl halides from isomeric alkyl halides of the same molecular weight, which comprises treating such an isomeric non-primary alkyl halide at a temperature between approximately 350 and 1300° F. at a pressure in excess of 200 pounds per square inch for a period of time sufficient to effect the formation of a primary alkyl halide, and recovering said primary alkyl halide from the reaction product.

3. A process for the production of primary alkyl chlorides from isomeric alkyl chlorides of the same molecular weight, which comprises treating such an isomeric non-primary alkyl chloride at a temperature between approximately 350 and 1300° F. at a pressure in excess of 200 pounds per square inch for a period of time sufficient to effect the formation of a primary alkyl chloride, and recovering said primary alkyl chloride from the reaction product.

4. A process for the production of primary alkyl bromides from isomeric alkyl bromides of the same molecular weight, which comprises treating such an isomeric non-primary alkyl bromide at a temperature between approximately 350 and 1300° F. at a pressure in excess of 200 pounds per square inch for a period of time sufficient to effect the formation of a primary alkyl bromide, and recovering said primary alkyl bromide from the reaction product.

5. A process for the production of primary alkyl fluorides from isomeric alkyl fluorides of the same molecular weight, which comprises treating such an isomeric non-primary alkyl fluoride at a temperature between approximately 350 and 1300° F. at a pressure in excess of 200 pounds per square inch for a period of time sufficient to effect the formation of a primary alkyl fluoride, and recovering said primary alkyl fluoride from the reaction product.

6. A process for the production of primary alkyl monohalides from isomeric alkyl monohalides of the same molecular weight, which comprises treating a material containing a nonprimary alkyl monohalide at a reaction temperature of between approximately 350 and 1300° F. and at a pressure of from about 200 to 5000 pounds per square inch to effect an intramolecular rearrangement of said alkyl monohalides forming a primary alkyl monohalide, and separating from the product the primary alkyl monohalides so produced.

7. A process for the production of primary alkyl monohalides from isomeric alkyl monohalides of the same molecular weight, which comprises treating a material comprising a low boiling nonprimary alkyl monohalide of at least three carbon atoms per molecule at a reaction temperature and an elevated superatmospheric pressure for a sufficient period of time to effect an intramolecular rearrangement of said alkyl monohalides to a substantial extent to form a primary alkyl monohalide, separating and recovering from the reaction product of said treatment said primary alkyl monohalide so formed, and separating at least a portion of the decomposed products of said reaction and returning the same to the reaction zone.

8. A process for the production of primary alkyl monohalides from isomeric alkyl monohalides of the same molecular weight, which comprises subjecting a material comprising a low boiling nonprimary alkyl monohalide of at least three carbon atoms per molecule to conditions of elevated reaction temperature and superatmospheric pressure effecting an intramolecular rearrangement of said alkyl monohalides to a substantial effect to form a primary alkyl monohalide, separating and recovering from the reaction product of said treatment said primary alkyl monohalide so formed, and separating and returning to the reaction zone hydrogen halide produced in the process.

9. A process for the production of primary alkyl monohalides, which comprises subjecting a nonprimary monoalkyl halide of at least three carbon atoms per molecule to treatment under superatmospheric pressure in the presence of a catalyst at a temperature between approximately 350 and 750° F. for a period of time sufficient to form the corresponding primary alkyl monohalides, and recovering the primary alkyl monohalides so produced.

10. A process for the production of primary alkyl monohalides, which comprises subjecting a nonprimary monoalkyl halide of at least three carbon atoms per molecule to treatment under superatmospheric pressure in the presence of a metal oxide catalyst at a temperature between approximately 350 and 750° F. for a period of time sufficient to form the corresponding primary alkyl monohalides, and recovering the primary alkyl monohalides so produced.

11. The process of claim 10 carried out in the presence of 0.001 to 0.5 per cent of oxygen.

12. A process for the production of a primary propyl halide from a secondary propyl halide which comprises treating secondary propyl halide at a temperature between about 350 and about 1300° F., under a pressure in excess of 200 pounds per square inch for a period of time sufficient to produce a primary propyl halide, and separating from the products of said treatment the said primary propyl halide.

13. A process for the production of a primary propyl chloride from a secondary propyl chloride which comprises treating secondary propyl chloride at a temperature between about 350 and about 1300° F., under a pressure in excess of 200 pounds per square inch for a period of time sufficient to produce a primary propyl chloride, and separating from the products of said treatment the said primary propyl chloride.

14. A process for the production of a primary butyl halide from an isomeric butyl halide, which comprises treating an isomeric butyl halide at a temperature between about 350 and 1300° F. under a pressure in excess of 200 pounds per square inch for a period of time sufficient to form a primary butyl halide, and separating from the products of said treatment the said primary butyl halide.

15. A process for the production of a primary butyl fluoride from an isomeric butyl fluoride, which comprises treating an isomeric butyl fluoride at a temperature between about 350 and about 1300° F. under a pressure in excess of 200 pounds per square inch for a period of time sufficient to form a primary butyl fluoride, and separating from the products of said treatment the said primary butyl fluoride.

16. A process for the production of a primary amyl halide from a secondary amyl halide, which comprises treating a secondary amyl halide at a temperature between about 350 and about 1300° F. under a pressure in excess of 200 pounds per square inch for a period of time sufficient to form a primary amyl halide, and separating from the products of said treatment the said primary amyl halide.

17. A process for the conversion of a nonprimary alkyl halide to a primary alkyl halide, which comprises subjecting a low boiling nonprimary alkyl halide under a substantial superatmospheric pressure at a temperature between about 350 and 950° F. for a period of time such that no more than about 10 per cent of the effluent comprises material of higher molecular weight to form a corresponding primary alkyl halide, and recovering from the effluent a primary alkyl halide so produced.

GEORGE G. OBERFELL.
FREDERICK E. FREY.